United States Patent

[11] 3,615,802

[72] Inventors Roy J. Betty, Jr.
  Chicago, Ill.;
  Robert D. Timmons, Fennimore, Wis.
[21] Appl. No. 863,711
[22] Filed Oct. 3, 1969
[45] Patented Oct. 26, 1971
[73] Assignee Armour Industrial Chemical Company
  Chicago, Ill.
  Continuation-in-part of application Ser. No. 664,624, Aug. 31, 1967, now abandoned.

[54] THIXOTROPIC BITUMINOUS CUTBACK COMPOSITIONS AND PROCESS
  9 Claims, No Drawings

[52] U.S. Cl. ............................................. 106/278,
  106/279, 106/280, 106/281, 208/23, 208/44, 260/28
[51] Int. Cl. ....................................... C08h 13/00,
  C08h 17/22, C08i 1/46

[50] Field of Search ........................................ 106/122,
  273–285; 208/22, 23, 44; 260/28, 28.5, 82, 96.5,
  77.5 CR, 77.5 C, 2.5, 553; 252/49.6–51.5

[56] References Cited
  UNITED STATES PATENTS

| | | | |
|---|---|---|---|
| 2,445,655 | 7/1948 | Allen et al. | 208/289 X |
| 2,597,025 | 5/1952 | Orth, Jr. | 260/77.5 AM |
| 2,723,944 | 11/1955 | Chenicek | 208/207 |
| 2,901,369 | 8/1959 | Pordes | 106/273 N X |
| 3,143,517 | 8/1964 | Heiss | 260/77.5 AM X |
| 3,179,610 | 4/1965 | Wood | 106/273 N X |
| 3,182,032 | 5/1965 | Charlton et al. | 106/273 N X |
| 3,325,421 | 6/1967 | Muller | 260/77.5 AM X |
| 3,372,083 | 3/1968 | Evans et al. | 260/28 X |

Primary Examiner—Julius Frome
Assistant Examiner—Joan B. Evans
Attorney—Alexander and Speckman ABSTRACT: Thickened thixotropic bituminous cutback compositions comprising bituminous material, bituminous solvent and monomeric disubstituted urea formed by the in situ reaction of a long chain aliphatic amine and isocyanate, useful as adhesives, caulking compositions, and coatings.

THIXOTROPIC BITUMINOUS CUTBACK COMPOSITIONS AND PROCESS

CROSS-REFERENCE TO RELATED APPLICATION

This application is a Continuation-In-Part of our copending application Ser. No. 664,624, filed Aug. 31, 1967 now abandoned.

BACKGROUND OF THE INVENTION

Bituminous cutback systems, most commonly formulated from asphalt cutback with solvents such as mineral spirits, have been used in the past for coating compositions. One serious drawback of known compositions has been that when sufficient cutback solvent is utilized to permit application using conventional pneumatic equipment, the composition is of such a viscosity that it sags when applied to vertical surfaces, especially at higher temperatures. Another disadvantage of asphalt-cutback compositions known to the art is that the solvents are generally quite volatile thus resulting in a composition which changes viscosity as a result of evaporation of the solvent, thus requiring close control of the composition when spraying under field conditions.

SUMMARY OF THE INVENTION

This invention is directed toward compositions which obviate many of the disadvantages experienced with prior art materials. This invention provides compositions which can be used as adhesives, caulking agents, coatings, and the like, having thixotropic properties rendering a gel of medium firmness which may be sprayed with pneumatic equipment and having no sag when applied to vertical surfaces.

It is an object of this invention to provide a thixotropic thickened bituminous cutback composition which can be readily formulated under field conditions to provide stable compositions of various viscosities. A further object is to provide bituminous cutback compositions which can be sprayed onto vertical surfaces without exhibiting sag. A still further object is to provide bituminous cutback compositions which form stable invert emulsions in water. The thixotropic gelled bituminous cutback composition of our invention comprises bituminous material, organic bituminous solvent, and monomeric disubstituted urea produced by the in situ reaction of an aliphatic monoamine and an isocyanate selected from the group consisting of aromatic and aliphatic mono- and polyisocyanates. Mixtures of amines and mono- and polyisocyanates can be used.

Aliphatic mono, primary and secondary amino compounds are preferred amine reactants, particularly amines containing an aliphatic group of from about six to 22 carbon atoms attached to an amino nitrogen. Such aliphatic groups may be a branched or straight hydrocarbon chain, saturated or unsaturated, cyclic, or an arylalkyl group such as 9,10-phenylstearyl as derived from oleic acid. Primary monoamines selected from the group consisting of N-normal-alkyl, N-normal-alkenyl and N-secondary-alkyl amines having from about six to 22 carbon atoms are preferred.

N-secondary-alkyl amines are especially useful due to their low melting points providing amines having fluid properties under field conditions. N-secondary-alkyl amines can be produced by amidation of olefins in hydrogen fluoride followed by conversion of the amide to an amine as described in U.S. Pat. No. 3,338,967. The amines thus formed are an isomeric composition with respect to attachment of the nitrogen to the aliphatic chain and of mixed chain length reflecting the olefin cut used as a reactant. These amines can be described by the formula

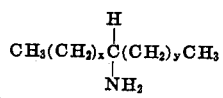

wherein x and y are integers of zero to about 19, provided the sum of x and y is of from about 3 to 19. One preferred subclass is N-secondary-alkyl amines having from about seven to 18 carbon atoms.

Organic isocyanates suitable for use in this invention may be any isocyanates having one, two, three or more functional or reactive isocyanate groups which react with a primary and secondary amine to form disubstituted urea. It may be an aromatic-aliphatic or aliphatic-aromatic isocyanate compound. Preferred isocyanates are mono-, di-, and triisocyanates. Examples of useful isocyanates are phenyl isocyanate, tolylene diisocyanate, p,p-diisocyanato diphenylmethane, dimethyl diphenylmethane diisocyanate, bitolylene diisocyanate, dibenzyl diisocyanate, durene diisocyanate, diphenyl dimethyl methane diisocyanate, 4-tertbutyl-2,6-tolylene diisocyanate, hexamethylene diisocyanate, 4-isopropyl-2,6-tolylene diisocyanate, naphthalene-1,5-diisocyanate, naphthalene triisocyanate, dichlorodiphenyl methane diisocyanate, metaphenylene diisocyanate, paraphenylene diisocyanate, diphenylene ether diisocyanate, tolylene diisocyanate dimer, and polyaryl polyisocyanates such as the reaction product of aniline and formaldehyde which has been reacted with phosgene (Mondur MR, Mobay Chemical Co., Pittsburgh, Pa.), "PAPI" (The Carwin Company, North Haven, Conn.) having the general formula:

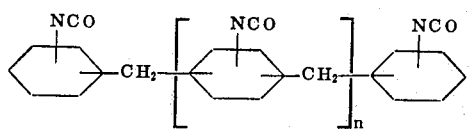

where n has an average value of 1. Especially preferred aliphatic isocyanates are long chain aliphatic isocyanates wherein the aliphatic group contains from about six to 22 carbon atoms. It is especially preferred to use difunctional isocyanates, or prepolymers thereof, selected from the group consisting of aromatic diisocyanates such as toluene diisocyanate and aliphatic diisocyanates such as hexamethylene diisocyanate and the long chain aliphatic diisocyanates such as derived from aminostearylamine and aminomethylstearylamine. Toluene diisocyanate is especially preferred in formulating the compositions of this invention.

Compositions according to this invention may be formulated by forming from about 2 to 10 weight percent monomeric disubstituted urea. Preferred compositions contain from 4 to 8 weight percent monomeric disubstituted urea. The optimum concentration of disubstituted urea will vary depending upon the type of bituminous material and solvent utilized and the particular thickening properties desired.

Bituminous materials useful in this invention include natural and synthetic bituminous substances including bitumen, pyrobitumen, asphalt, asphaltite, asphaltic pyrobitumen, nonasphaltic pyrobitumen, residual asphalt, tar and/or pitch, containing asphaltene or tarlike components. Pine tar or tar which is used for cutting hard resins, coal tar, coke oven or gas plant tar, road tars or oils, pitches, roofing pitches, other coal tar fractions, cracked, straight run or natural asphalts, petroleum distillation residues and asphalts, coumarone-indene resins, and the like can be used as well as synthetic bituminous substances. The term bituminous materials as used herein is used in its commonly accepted meaning as exemplified in the book by Herbert Abraham, "Asphalts and Allied Substances," D. Van Nostrand Co., Inc., New York, 5th 5th ed., Vol. 1, 1945, especially pp. 56–69. The compositions of this invention may contain from about 30 to 70 weight percent of bituminous materials, from about 40 to 60 percent being preferred.

Any organic solvent in which the minimum solubility of bituminous material is 40 weight percent is suitable for use in this invention and will be referred to herein as "organic bituminous solvent." Suitable organic bituminous solvents include aliphatic organic solvents such as aliphatic napthas, including textile spirits having a boiling point range of about 180° to 250° F. and a Kauri-butanol value of about 30 to 40; V.M.&P. naptha having a boiling point range of about 220° to 300° F. and a Kauri-butanol value of about 35 to 45; mineral spirits having a boiling point range of about 300° to 400° F. and a Kauri-butanol value of about 25 to 45; kerosene having a boiling point range of about 400° to 520° F. and a Kauri-butanol value of about 25 to 30; including the commonly known distillates, including turpentine, gasoline, and the like. Also suitable for use as organic bituminous solvents are aromatic napthas having a boiling point of 220° to 320° F. and a Kauri-butanol value of about 70 to 90; aromatic mineral spirits having a boiling point of 300° to 410° F. and a Kauri-butanol value of about 80 to 90; and aromatic kerosene having a boiling point of 380° to 500° F. and a Kauri-butanol value of about 95 to 105. Also suitable as organic bituminous solvents are general organic solvents including benzene, toluene, carbon tetrachloride, methlisobutylketone, methylethylketone, ethylene glycol monomethyl ether, and the like. The choice of solvent is dependent upon the rate of cure desired and nature of bituminous material utilized. For example, more volatile solvents are selected for rapid curing properties. The compositions of this invention may contain from about 30 to 70 weight percent of solvent materials, from about 40 to 60 percent being preferred.

The thixotropic gelled bituminous cutback compositions may also contain other additives which do not interfere with the disubstituted urea forming reaction, such as fillers, synthetic resins such as polybutadiene, ethylene propylene copolymers, styrene butadiene copolymers, ethylene vinyl acetate copolymers, acrylic polymers, vinyl chloride and its copolymers, acrylonitrile and its copolymers, acrylonitrile-butadiene-styrene, and the like.

This invention includes the process of producing thixotropic gelled bituminous cutback composition comprising mixing an aliphatic monoamine selected from the group consisting of an aliphatic hydrocarbon group of about six to 22 carbon atoms attached to the amine nitrogen and an isocyanate selected from the group consisting of aromatic and aliphatic mono-, di-, and triisocyanates, provided said aliphatic isocyanates have about six to 22 carbon atoms in the aliphatic group, and provided said aliphatic group is added in from the stoichiometric requirement of amine to isocyanate to about 40 percent excess amine to form about 2 to 10 weight percent monomeric disubstituted urea in situ in a bituminous cutback composition comprising about 30 to 70 weight percent bituminous material and about 30 to 70 weight percent organic bituminous solvent. The thixotropic composition can be formulated by mixing of the amine and isocyanate reactants in the bituminous cutback composition to form disubstituted urea in situ It is preferred to add the amine to the bituminous cutback system first and then add the isocyanate with stirring. To form the monomeric disubstituted urea, it is suitable to use from the stoichiometric requirement of amine and isocyanate to about 40 percent excess of amine.

The compositions of this invention may be formulated in batches by simple mixing in tanks, and stored for use as desired. Such compositions are stable over long periods of time. The compositions may also be formulated on a continuous basis such as may be desired in spraying applications, simply by introducing the appropriate quantities of amine and isocyanate into the bituminous cutback flow in a pipe leading to the spray nozzle.

The compositions of this invention may be applied directly by spraying or troweling, or as invert aqueous emulsions. The compositions form stable invert emulsions when about 8 to 10 weight percent water is added. Such invert emulsions are especially useful in adhesive and caulking applications.

The following examples are presented to illustrate the present invention.

The organic bituminous solvents used in the following specific examples are:

Mineral Spirits Aliphatic naptha having a boiling point range of about 300° to 400° F. and a Kauri-butanol value of about 35 to 45.

Textile Spirits Aliphatic naptha having a boiling point range of about 180° to 250° F. and a Kauri-butanol value of about 30 to 40.

V.M.&P naptha Aliphatic naptha having a boiling point range of about 220° to 300° F. and a Kauri-butanol value of about 35 to 45.

Example I

A bituminous cutback blend was formulated using 60 weight percent 40–50 pen. asphalt and 40 weight percent mineral spirits. The mineral spirits solvent and asphalt were stirred until a material of uniform viscosity was obtained. Then the amine noted in table I was added to the asphalt cutback with stirring, followed by the addition of toluene diisocyanate to produce the concentration and mole ratio noted in table I. Stirring was continued until maximum thickening was obtained, usually a matter of seconds or only a few minutes. After aging for 1 week, the gels in each case had the same appearance as noted under Initial Gel Appearance in table I.

Half-cone penetration was obtained using a penetrometer as described in A.S.T.M. test D-217-60T for Cone Penetration of Lubricating Grease. The penetration test was made first on unworked material which had received minimum handling in transferring from the sample bottle to the test apparatus, and secondly, the penetration test was run on worked material at room temperature subjected to 60 strokes of a metal spatula. The half-cone penetration may be converted to standard cone penetrations as designated in A.S.Y.M. test D-217-60T by multiplying the half-cone penetration by 2 and adding 10 to the result. Results of the penetration tests are set forth in table I.

TABLE I.—THICKENED ASPHALT CUTBACK

| Amine | Amine-toluene diisocyanate mole ratio | Total amine-diisocyanate conc., percent | Time of gelation | Initial gel appearance | Half cone penetration (1/10 mm.) | |
|---|---|---|---|---|---|---|
| | | | | | Unworked | Worked |
| N-sec-alkyl(C$_{7-9}$) amine | 2-1 | 4 | 5 sec. | Very thick, viscous | 230 | 250 |
| Do | 2-1 | 6 | 5 sec. | do | 228 | 255 |
| Do | 2-1 | 8 | 5 sec. | do | 208 | 213 |
| Do | 2.4-1 | 4 | 5 sec. | Very thick gel | 230 | 255 |
| Do | 2.4-1 | 6 | 5 sec. | do | 220 | 245 |
| Do | 2.4-1 | 8 | 5 sec. | do | 210 | 215 |
| N-sec-alkyl (9-10) amine | 2-1 | 4 | 5 sec. | Very thick, viscous | 210 | 250 |
| Do | 2-1 | 6 | 5 sec. | do | 215 | 230 |
| Do | 2-1 | 8 | 5 sec. | do | 220 | 240 |
| Do | 2.4-1 | 4 | 5 min. | Very thick gel | 200 | 225 |
| Do | 2.4-1 | 6 | 5 min. | do | 210 | 225 |
| Do | 2.4-1 | 8 | 5 min. | do | 225 | 245 |
| N-sec-alkyl(C$_{11-14}$)amine | 2-1 | 4 | 5 sec. | Slightly viscous gel | | |
| Do | 2-1 | 6 | 5 sec. | Thick gel | | |
| Do | 2-1 | 8 | 5 sec. | do | | |
| Do | 2.4-1 | 4 | 5 min. | Slightly viscous gel | | |
| Do | 2.4-1 | 6 | 5 sec. | Thick gel | | |
| Do | 2.4-1 | 8 | 5 sec. | do | | |
| N-sec-alkyl(C$_{15-20}$)amine | 2-1 | 4 | 5 min. | do | | |
| Do | 2-1 | 6 | 5 sec. | do | | |
| Do | 2-1 | 8 | 5 sec. | do | | |
| Do | 2.4-1 | 4 | 5 min. | Slightly viscous | | |
| Do | 2.4-1 | 6 | 5 sec. | Thick gel | | |
| Do | 2.4-1 | 8 | 5 sec. | do | | |

The thickened asphalt cutback compositions formulated in this fashion exhibited good stability.

EXAMPLE II

A bituminous cutback blend was formulated using 60 weight percent Venezuelan asphalt 60–70 penetration and 40 weight percent textile spirits. The textile spirits solvent and the Venezuelan asphalt cutback were stirred until a composition of uniform viscosity was obtained. The amine noted in table II was added to the asphalt cutback with stirring, followed by the addition of toluene diisocyanate to produce the concentration and mole ratio noted in table II. Stirring was continued until maximum firmness was obtained, taking usually a matter of seconds or only a few minutes. After aging for 1 week, the gels in each case had the same appearance as noted under Initial Gel Appearance in table II.

Half-cone penetration was obtained in the same manner as in example I and the results are shown in table II.

The thickened asphalt cutback compositions formulated in this manner using from 6 to 8 percent monomeric disubstituted urea concentration formed from N-sec-alkyl($C_{9110}$) amine in a 2:1 amine:diisocyanate ratio result in excellent gels of medium firmness which can be sprayed with pneumatic equipment and have zero sag on a vertical surface at 150° F.

EXAMPLE IV

An asphalt-Neoprene cutback blend was formulated in the following manner.

Part A was made by mixing 30 weight percent DuPont Neoprene AF, a sole polymer of 2-chlorobutadiene stabilized with thiuram disulfide and containing no sulfur linkages in the polymer molecule with 70 weight percent perchloroethylene.

Part B was formulated by mixing 40 weight percent textile spirits with 60 weight percent Venezuelan asphalt 60–70 pen.

Seven hundred grams of Part A were blended with 700 grams of Part B and N-sec-alkyl($C_{719}$)amine and toluene diisocyanate were added in a mole ratio of 2:1 and mixed until uniform consistency was obtained to form 4 weight percent urea. Then 1,400 grams of Part B were added and mixing was continued until uniform consistency was obtained. Then N-sec-alkyl($C_{719}$)amine and toluene diisocyanate were added at a molar ratio of 2:1 with stirring to form a total of 6 weight percent monomeric disubstituted urea, based upon the total composition of 2,800 grams.

The above process was found to permit addition of Neoprene into asphalt cutback much more readily than prior used methods since the increased viscosity permitted the Neoprene to be mixed into the cutback very easily.

TABLE II.—THICKENED RAPID CURING ASPHALT CUTBACK

| Amine | Amine-toluene diisocyanate mole ratio | Total amine-diisocyanate conc., percent | Time of gelation | Initial gel appearance | Half cone penetration (1/10 mm.) | |
|---|---|---|---|---|---|---|
| | | | | | Unworked | Worked |
| N-sec-alkyl($C_{7-9}$)amine | 2–1 | 4 | 5 min | Soft firm | 380 | Too fluid. |
| Do | 2–1 | 6 | 5 sec | do | 370 | Do. |
| Do | 2–1 | 8 | 5 sec | Hard firm | 360 | 255. |
| Do | 2.4–1 | 4 | 5 min | Soft firm | 365 | Too soft. |
| Do | 2.4–1 | 6 | 5 sec | Hard firm | 395 | Do. |
| Do | 2.4–1 | 8 | 5 sec | do | 325 | Do. |
| N-sec-alkyl($C_{9-10}$)amine | 2–1 | 4 | 5 min | Soft firm | Over 380 | Too fluid. |
| Do | 2–1 | 6 | 5 sec | Hard firm | 275 | 265. |
| Do | 2–1 | 8 | 5 sec | do | 295 | 275. |
| Do | 2.4–1 | 4 | 5 min | Soft firm | Too soft | Too soft. |
| Do | 2.4–1 | 6 | 5 sec | Hard firm | do | Do. |
| Do | 2.4–1 | 8 | 5 sec | do | 290 | Do. |
| N-sec-alkyl($C_{11-14}$)amine | 2–1 | 4 | | Viscous liquid | Too fluid | Too fluid. |
| Do | 2–1 | 6 | | do | do | Do. |
| Do | 2–1 | 8 | 5 min | Hard firm | 300 | Over 380. |
| Do | 2.4–1 | 4 | 5 min | Soft firm | 365 | Too soft. |
| Do | 2.4–1 | 6 | 5 sec | Hard firm | Too soft | Do. |
| Do | 2.4–1 | 8 | 5 sec | do | do | Do. |
| N-sec-alkyl($C_{15-20}$)amine | 2–1 | 4 | 5 min | Soft firm | Too fluid | Too fluid. |
| Do | 2–1 | 6 | 5 min | do | 350 | Too soft. |
| Do | 2–1 | 8 | 5 min | Hard firm | 258 | 280. |
| Do | 2.4–1 | 4 | 5 min | Soft firm | Too soft | Too soft. |
| Do | 2.4–1 | 6 | 5 min | do | do | Do. |
| Do | 2.4–1 | 8 | 5 min | do | do | Do. |

EXAMPLE III

A polyvinyl-asphalt cutback was formulated using 40 weight percent polyvinyl-asphalt cutback with 60 weight percent textile spirits. The polyvinyl-resin-asphalt component contained 79.4 weight percent asphalt and 20.6 weight percent of a copolymer of vinyl acetate and ethylene resin sold by DuPont under the trademark Alvax. The asphalt was 50 weight percent 60–70 pen. vacuum reduced asphalt and 50 weight percent propane precipitated asphalt. The asphalt blend had a penetration of approximately 30 at 77° F. The textile spirits solvent and polyvinyl-resin-asphalt were mixed until a composition of uniform viscosity was obtained. Then N-sec-alkyl($C_{719}$)amine and toluene diisocyanate were added to the polyvinyl-resin-asphalt cutback in a mole ratio of 2:1 to form 4 weight percent urea in the thickened composition. Stirring was continued until maximum thickening was obtained, usually only a matter of a few seconds or only a few minutes. A Gardner Mobilometer test resulted in 6 seconds for a 100 gram load of the gelled composition.

The thickened polyvinyl-resin-asphalt cutback compositions formulated as above exhibited good stability and excellent properties as a crack sealer.

EXAMPLE V

A petroleum resin cutback composition was formulated using a petroleum resin blend as follows: 60 weight percent Piccopale 100 SF [an alkyl cyclic polymer produced by Pennsylvania Industrial Chemical Company having molecular weight of 1,400 produced by the polymerization of dienes and reactive olefins having an approximate average molecular weight of 90 derived from high-temperature cracking of petroleum, melting point ball and (A.S.T.M.) 100° C. Gardner Color 11, specific gravity 0.96–0.98, bromine number (electrometric) 36, iodine number (Wijs method) 145, flash point (C.O.C.) 510° F.]; 25 weight percent 42–40 oil [a plasticizing oil produced by Sun Oil Company having the following asphaltenes zero percent, polar compounds 3.64 percent, aromatics 44.13 percent, saturates 53.23 percent, having a molecular weight of 390, flash point (C.O.C.) 440° F., specific gravity 0.949]; 5 weight Oletac 100 [amorphous polypropylene produced by Avisun Corporation, white solid, noncrystalline polymeric hydrocarbon, specific gravity 20/40.86, softening point (ring and ball) 240–280, flash point (C.O.C.) 425–445° F., molecular weight about 15,000]; and 5 weight percent Oletac 200 produced by Avisun Corporation [a higher molecular weight above about 35,000 amorphous polypropylene]. The above blend of bituminous materials was cutback with mineral spirits to form a 60 weight percent bituminous and 40 weight percent mineral spirits composition. The composition was then gelled by the in situ reaction of an amine and toluene diisocyanate as described in example I. Observations and tests as set forth in example I were performed and the results are shown in table III.

TABLE III.—THICKENED PETROLEUM RESIN CUTBACK

| Amine | Amine-toluene diisocyanate mole ratio | Total amine-diisocyanate conc., percent | Time of gelation | Initial gel appearance | Cone penetration (1/10 mm.) | |
|---|---|---|---|---|---|---|
| | | | | | Unworked | Worked |
| N-sec-alkyl (C$_{7-9}$) amine | 2-1 | 4 | 5 sec | Hard solid | 267 | 335 |
| Do | 2-1 | 6 | 5 sec | do | 245 | 300 |
| Do | 2-1 | 8 | 5 sec | do | 235 | 295 |
| Do | 2.4-1 | 4 | 5 sec | do | 260 | 340 |
| Do | 2.4-1 | 6 | 5 sec | do | 250 | 300 |
| Do | 2.4-1 | 8 | 5 sec | do | 225 | 249 |
| N-sec-alkyl (C$_{9-10}$) amine | 2-1 | 4 | 5 sec | do | 275 | 350 |
| Do | 2-1 | 6 | 5 sec | do | 250 | 300 |
| Do | 2-1 | 8 | 5 sec | do | 220 | 285 |
| Do | 2.4-1 | 4 | 5 sec | Soft firm | 275 | 305 |
| Do | 2.4-1 | 6 | 5 sec | do | 245 | 295 |
| Do | 2.4-1 | 8 | 5 sec | do | 220 | 242 |
| N-sec-alkyl (C$_{11-14}$) amine | 2-1 | 4 | 5 min | Soft flowing | | |
| Do | 2-1 | 6 | 5 min | do | | |
| Do | 2-1 | 8 | 5 min | do | | |
| Do | 2.4-1 | 4 | 5 min | do | | |
| Do | 2.4-1 | 6 | 5 min | Soft firm | | |
| Do | 2.4-1 | 8 | 5 min | do | | |
| N-sec-alkyl (C$_{15-20}$) amine | 2-1 | 4 | 5 min | Thick semigel | | |
| Do | 2-1 | 6 | 5 min | do | | |
| Do | 2-1 | 8 | 5 min | do | | |
| Do | 2.4-1 | 4 | 5 min | Soft flowing | | |
| Do | 2.4-1 | 6 | 5 min | do | | |
| Do | 2.4-1 | 8 | 5 min | do | | |

EXAMPLE VI

A petroleum resin-naptha cutback composition was formulated using the same bituminous material as example V and 40 weight percent V.M.&P. naptha. The same observations and tests were conducted and are shown in table IV.

TABLE IV.—THICKENED PETROLEUM RESIN CUTBACK

| Amine | Amine-toluene diisocyanate mole ratio | Total amine-diisocyanate conc., percent | Time of gelation | Initial gel appearance | Cone penetration (1/10 mm.) | |
|---|---|---|---|---|---|---|
| | | | | | Unworked | Worked |
| N-sec-alkyl (C$_{7-9}$) amine | 2-1 | 4 | 5 sec | Firm soft | | |
| Do | 2-1 | 6 | 5 sec | do | | |
| Do | 2-1 | 8 | 5 sec | do | 230 | 310 |
| Do | 2.4-1 | 4 | 5 sec | Slight soft | | |
| Do | 2.4-1 | 6 | 5 sec | Soft firm | 215 | 330 |
| Do | 2.4-1 | 8 | 5 sec | Firm hard | 210 | 320 |
| N-sec-alkyl (C$_{9-10}$) amine | 2-1 | 4 | 5 sec | Slight viscous | | |
| Do | 2-1 | 6 | 5 sec | Soft firm | | |
| Do | 2-1 | 8 | 5 sec | do | 213 | 300 |
| Do | 2.4-1 | 4 | 5 sec | Slight soft | | |
| Do | 2.4-1 | 6 | 5 sec | Soft firm | 210 | 310 |
| Do | 2.4-1 | 8 | 5 sec | Hard firm | 200 | 305 |
| N-sec-alkyl (C$_{11-14}$) amine | 2-1 | 4 | 5 sec | Viscous liquid | | |
| Do | 2-1 | 6 | 5 sec | do | | |
| Do | 2-1 | 8 | 5 sec | do | | |
| Do | 2.4-1 | 4 | 5 sec | Viscous fluid | | |
| Do | 2.4-1 | 6 | 5 sec | Slight soft | | |
| Do | 2.4-1 | 8 | 5 sec | Firm soft | 260 | 380 |
| N-sec-alkyl (C$_{15-20}$) amine | 2-1 | 4 | 5 sec | Viscous liquid | | |
| Do | 2-1 | 6 | 5 sec | Viscous slight | | |
| Do | 2-1 | 8 | 5 sec | Viscous soft firm | 210 | 310 |
| Do | 2.4-1 | 4 | 5 sec | Viscous fluid | | |
| Do | 2.4-1 | 6 | 5 sec | Soft firm | 250 | 37 |
| Do | 2.4-1 | 8 | 5 sec | do | 225 | 34 |

EXAMPLE VII

A petroleum resin cutback composition was formulated using 40 weight percent of the bituminous materials set forth in example V and 60 weight percent V.M.&P. naptha. Such compositions were gelled using oleyl amine derived from tal-loil sources and cocoamine plus toluene diisocyanate in a 2:1 mole ratio to form monomeric disubstituted urea *in situ*. From 4 to 8 percent disubstituted urea was formed in situ to produce gels as set forth in table V.

Table V

| Amine | Total Amine-Diisocyanate Conc. | Time of Gelation | Initial Gel Appearance |
|---|---|---|---|
| Cocoamine | 4% | 5 min. | Soft firm |
| Cocoamine | 6% | 5 sec. | Hard firm |
| Cocoamine | 8% | 5 sec. | Hard firm |
| Oleylamine | 4% | 5 min. | Soft firm |
| Oleylamine | 6% | 5 sec. | Hard firm |
| Oleylamine | 8% | 5 sec. | Hard firm |

EXAMPLE VIII

An asphalt cutback composition made of 60 weight percent Venezuelan 60–70 pen. asphalt and 40 weight percent mineral spirits was gelled using oleyl amine derived from talloil sources and cocoamine plus toluene diisocyanate in a 2:1 mole ratio to form monomeric disubstituted urea in situ. From 4 to 8 percent monomeric disubstituted urea was formed in situ to produce gels as set forth in table VI.

Table VI

| Amine | Total Amine-Diisocyanate Conc. | Time of Gelation | Initial Gel Appearance |
|---|---|---|---|
| Cocamine | 4% | 5 sec. | Soft firm |
| Cocamine | 6% | 5 sec. | Soft firm |
| Cocoamine | 8% | 5 sec. | Soft firm |
| Oleylamine | 4% | 5 sec. | Soft firm |
| Oleylamine | 6% | 5 sec. | Soft firm |
| Oleylamine | 8% | 5 sec. | Hard firm |

EXAMPLE IX

A rapid-curing cutback composition was formulated using 60 weight percent Venezuelan 60–70 pen. asphalt and 40 weight percent textile spirits. Such compositions were gelled using oleyl amine derived from talloil sources and cocoamine plus toluene diisocyanate in a 2:1 mole ratio to form monomeric disubstituted urea *in situ*. From 4 to 8 percent disubstituted urea was formed in situ to produce gels as set forth in table VII.

Table VII

| Amine | Total Amine-Diisocyanate Conc. | Time of Gelation | Initial Gel Appearance |
|---|---|---|---|
| Cocoamine | 4% | 5 min. | Thick liquid |
| Cocoamine | 6% | 5 min. | Viscous liquid |
| Cocoamine | 8% | 5 sec. | Firm solid |
| Oleylamine | 4% | 5 min. | Viscous liquid |
| Oleylamine | 6% | 5 min. | Viscous liquid |
| Oleylamine | 8% | 5 sec. | Firm Solid |

EXAMPLE X

A coating composition was formulated using 35 weight percent of 100 percent mineral gilsonite, (unintaite) 12.5 weight percent 60–70 pen. asphalt, and 52.5 weight percent mineral spirits to prepare an aluminum finish coating composition. Thirty-eight weight percent, based upon the total composition, aluminum paste was added to the unintaite-asphalt cutback composition. The composition was thickened using $C_{11\text{–}15}$ *secondary*-alkyl primary amine and toluene diisocyanate in a 2.2:1 mole ratio to form 5 percent monomeric disubstituted urea in situ. The composition was found to be a readily brushed composition which dried to a glossy tack-free, water and corrosion resistant finish.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A thixotropic gelled bituminous cutback composition comprising about 30 to 70 weight percent bituminous material, about 30 to 70 weight percent organic bituminous solvent, and about 2 to 10 weight percent monomeric disubstituted urea produced by in situ reaction of an aliphatic monoamine selected from the group consisting of primary and secondary amines having an aliphatic hydrocarbon group of about six to 22 carbon atoms attached to the amino nitrogen with an isocyanate selected from the group consisting of aromatic and aliphatic mono-, di- and triisocyanates, provided said aliphatic isocyanates have about six to 22 carbon atoms in the aliphatic group, and provided said amine being added in from the stoichiometric requirement of amine to isocyanate to about 40 percent excess amine.

2. The composition of claim 1 wherein said amine is a primary monoamine selected from the group consisting of N-*normal*-alkyl, N-*normal*-alkenyl and N-*secondary*-alkyl amines.

3. The composition of claim 1 wherein said amine is an N-*secondary*-alkyl amine having the formula

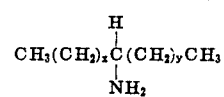

wherein x and y are integers of zero to about 19, provided the sum of x and y is from about 3 to 19.

4. The composition of claim 1 wherein said isocyanate is a diisocyanate selected from the group consisting of toluene diisocyanate and aliphatic diisocyanates having from about six to 22 carbon atoms.

5. The composition of claim 4 wherein said diisocyanate is toluene diisocyanate.

6. The composition of claim 1 wherein said bituminous material is asphalt.

7. The composition of claim 1 wherein said bituminous material is asphalt, said amine is selected from the group consisting of N-*normal*-alkyl, N-*normal*-alkenyl and N-*secondary*-alkyl amines, and said isocyanate is toluene diisocyanate.

8. The composition of claim 7 wherein said amine is an N-*secondary*-alkyl amine having the formula

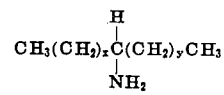

wherein x and y are integers of zero to about 15, provided the sum of x and y is from about 4 to 15.

9. The composition of claim 7 containing from about 4 to 8 weight percent of said monomeric disubstituted urea.

* * * * *